1,605,440

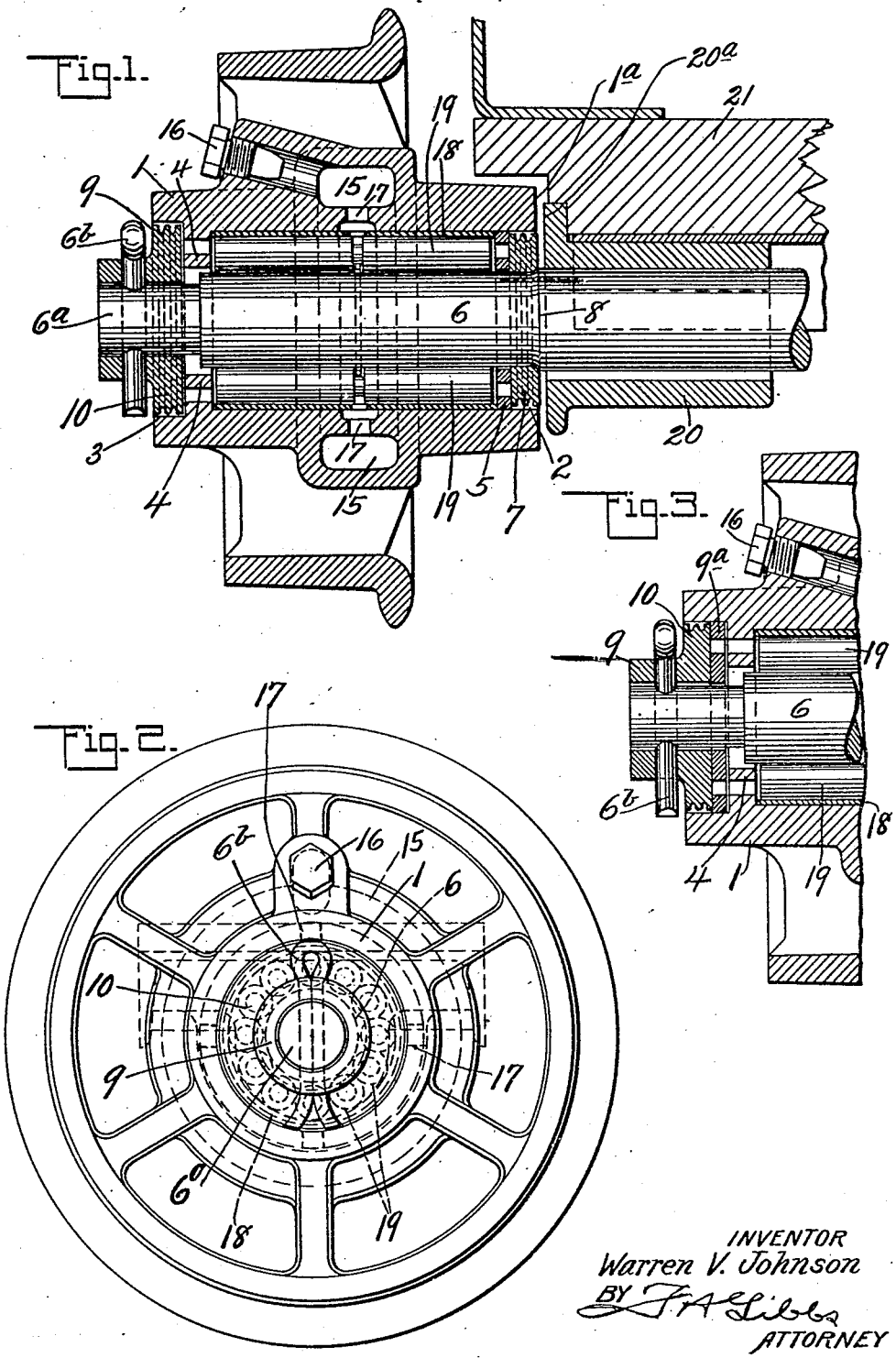
Nov. 2, 1926.
W. V. JOHNSON
MINE CAR STRUCTURE
Filed April 28, 1926
1,605,440
INVENTOR
Warren V. Johnson
BY
ATTORNEY Patented Nov. 2, 1926.

UNITED STATES PATENT OFFICE.

WARREN V. JOHNSON, OF BLOOMSBURG, PENNSYLVANIA, ASSIGNOR TO AMERICAN CAR AND FOUNDRY COMPANY, OF NEW YORK, N. Y., A CORPORATION OF NEW JERSEY.

MINE-CAR STRUCTURE.

Application filed April 28, 1926. Serial No. 105,116.

In the drawings:

Fig. 1 is a central vertical sectional view through the wheel forming my invention showing the axle therein, the axle being in full lines;

Fig. 2 is an end elevational view of the wheel, and

Fig. 3 illustrates a slight modification hereinafter specifically referred to.

The object of the invention is to provide a roller bearing wheel adapted to cooperate with an axle of a mine car or other wheeled vehicle in which wheel is carried a plurality of friction reducing means such as a roller bearing assembly and in which the independently movable parts of the assembly are so arranged that an ample supply of lubricant will at all times be provided.

Referring specifically to the parts shown in the accompanying drawing 1 indicates a hub portion of a wheel provided with an axle bore 2 of relatively large diameter open at its inner end and of an enlarged and considerably exaggerated diameter 3 at its outer end with an intermediate perforated annular shoulder or wall 4 preferably integral with the hub portion of the wheel. The wheel also is equipped with a separately formed perforated washer 5 which is inserted from the inner end of the axle bore. Cooperating with the wheel is a shouldered axle 6 upon which is placed the collar 7 within the inner end of the axle bore, this collar abutting a shoulder 8 on the axle, and there is a flanged collar 9 pinned to the outer end of the axle with a flanged portion 10 thereon extending into the enlarged outer portion of the axle bore at 3.

It is obvious that centrifugal force will throw any lubricant of a fluid or semi-fluid nature supplied to the wheel towards the outer zone of any space in which such lubricant is confined, and it is this tendency which has caused untold trouble in the operation of cars equipped with wheels which rotate in contact with fixed parts of the car structure or means carried on the axle upon which the wheels are threaded. For the purpose of providing ample lubricant, a lubricating chamber 15 is provided which is closed at its ingress port by the plug 16 or any suitable device and such lubricant is fed to the interior of the wheel through the passages 17 and through coincident passages in the sleeve 18 in which the roller bearings 19 rotate around the axle 6.

While mine cars move at relatively slow speed, the speed is sufficient to throw the lubricant when of a semi-fluid nature to the inner face of the enlarged outer axle bore 3 and to the inner face of the hub bore, between the outer perimeter of the collar 7 and the inner bore of the wheel, so that as the axle rotates with the collar 7 and the flanged collar 9, or as the wheel rotates independently thereof on a straight track, an ample supply of lubricant will be provided between said collars and the axle bore of the wheel hub at its ends. There will also be sufficient lubricant provided between the collar 7 and the perforated washer 5 at the inner end of the wheel and between the inner face of the flange 10 and the integral annular shoulder 4 which projects into the axle bore. Thus it will be seen that a wheel having a hub portion of relatively small diameter is provided without the enclosing caps which have heretofore been commonly used and encircling the inner end of the wheel hub. The axle 6 having shoulder 8 rotates in journal boxes 20 which are the supporting means for the mine car or other structure indicated at 21, and in assembling the parts the journal boxes 20 are secured to the car body after which the axles are threaded through such journal boxes and the collars 7 are placed in position in contact with the shoulders 8 on the axles, after which the wheel assembly with the annular perforated member 5, the roller bearing sleeve 18 and roller bearings 19 are threaded upon the axle, after which the flanged washer 9 is placed upon the reduced outer end portion $6^a$ of the axle and the linch pin $6^b$ is projected through coincident perforations in the washer 9 and the axle at $6^a$ thereby securing the wheels in position upon the axle and securing such pins against end thrust, that is, thrust longitudinally of the axle. So that, in normal service, the collar 7 serves as a stop to prevent the inner face $1^a$ of the wheel hub contacting with the outer face $20^a$ of the journal box, thereby preventing the usual frictional abrasion and wear common with this type of wheel. Where it is desirable to do so, an additional perforated washer $9^a$ may be inserted between the flanges 10 of the washer 9 as shown in Fig. 3, though this may be omitted if desired.

The function of the flanged washer 10 being to serve as a stop secured to the axle 6 for the purpose of limiting outward thrust of the wheel, that is, longitudinally of the axle, it is obvious that a collar of the entire diameter of the flange 10 of collar 9 may be substituted, but as this is so obvious, further illustration is not provided, the principal object being to provide a stop which is secured to the axle and which gets a bearing against an outer face portion of the wheel hub and is enclosed sufficiently within such hub to retain a proper supply of lubricant to prevent excessive friction between these parts.

What is claimed is:

1. In a roller bearing wheel, a hub portion provided with an axle bore of relatively large diameter open at its inner end and of enlarged diameter at its outer end with an intermediate annular shoulder portion, a sleeve and roller bearings in said axle bore, a separately formed perforated washer inserted from the inner end of the axle bore adapted to retain said sleeve and roller bearings in position, an axle, a collar within the wheel and an enlarged collar pinned to the axle and of such diameter as to extend into the enlarged outer portion of the axle bore.

2. In a wheel, a hub portion provided with an axle bore of relatively large diameter open at its inner end and of enlarged diameter at its outer end with an intermediate integral annular shoulder portion, a separately formed perforated washer inserted from the inner end of the axle bore, a roller bearing assembly held in position between said shoulder and washer, an axle, and an enlarged collar secured to the axle and projecting into the enlarged outer portion of the axle bore.

3. In a wheel, a hub portion provided with an axle bore of relatively large diameter open at its inner end and of enlarged diameter at its outer end with an intermediate perforated integral annular shoulder portion, a separately formed perforated washer inserted from the inner end of the axle bore, a shouldered axle, a collar surrounding the axle and abutting a shoulder thereon and an annularly flanged collar secured to the axle with its annular flange seated in the enlarged outer portion of the axle bore.

4. In a wheel, a hub portion provided with an axle bore of uniform diameter for the major portion of its length and of enlarged diameter at its outer end with an intermediate shoulder portion, a separately formed washer in the axle bore near its inner end, a collar within the wheel adapted to abut a shoulder on an axle and a flanged collar adapted to be secured on an axle with its flange portion extending into the enlarged outer portion of the axle bore and adapted to bear on said shoulder portion of the wheel hub.

5. In a wheel, a hub portion provided with an axle bore open at its inner end and of enlarged diameter at its outer end with an intermediate integral annular shoulder portion, a separately formed washer inserted from the inner end of the axle bore, a roller bearing assembly between the shoulder and the washer, an axle, a collar within the wheel hub abutting the washer, and an annularly flanged collar on the axle with its flange portion extending into the enlarged outer portion of the axle bore.

6. In a wheel, a hub portion provided with an axle bore of relatively large diameter open at its inner end and of enlarged diameter at its outer end with an intermediate perforated integral annular shoulder portion, a separately formed perforated washer inserted from the inner end of the axle bore, a shouldered axle, a collar within the wheel abutting a shoulder on the axle and a collar pinned to the axle extending into the enlarged outer portion of the axle bore and adapted to resist lateral thrust of the wheel.

In witness whereof I have hereunto set my hand.

WARREN V. JOHNSON.